United States Patent [19]

Ebbrecht et al.

[11] Patent Number: 5,494,979
[45] Date of Patent: Feb. 27, 1996

[54] ABHESIVE COATING COMPOSITION WITH AN ADDITIVE, WHICH AFFECTS THE DEGREE OF ABHESIVENESS

[75] Inventors: Thomas Ebbrecht, Witten; Peter Lersch, Oberhausen; Dietmar Wewers, Bottrop, all of Germany

[73] Assignee: Th. Goldschmidt AG, Essen, Germany

[21] Appl. No.: 358,634

[22] Filed: Dec. 19, 1994

Related U.S. Application Data

[63] Continuation-in-part of Ser. No. 214,862, Mar. 17, 1994, abandoned.

[30] Foreign Application Priority Data

Mar. 26, 1993 [DE] Germany .................. 43 09 831.2

[51] Int. Cl.$^6$ ................................... C08F 283/00
[52] U.S. Cl. ................ 525/479; 522/99; 528/23; 525/477
[58] Field of Search ................. 528/23; 522/99; 525/477, 479

[56] References Cited

FOREIGN PATENT DOCUMENTS

| 0168713 | 1/1986 | European Pat. Off. . |
| 0281681 | 9/1988 | European Pat. Off. . |
| 0464706 | 1/1992 | European Pat. Off. . |
| 0473995 | 3/1992 | European Pat. Off. . |
| 2948708 | 8/1980 | Germany . |
| 3820294 | 10/1989 | Germany . |
| 3810140 | 10/1989 | Germany . |
| 3841843 | 2/1990 | Germany . |

OTHER PUBLICATIONS

Encyclopedia of Polymer Science and Engineering, vol. 10, pp. 1–4 (1987) John Wiley & Sons, N.Y.

*Primary Examiner*—Melvyn I. Marquis
*Attorney, Agent, or Firm*—Anderson Kill Olick & Oshinsky

[57] ABSTRACT

An abhesive coating composition is based on an organopolysiloxane having radiation-curing (meth)acrylate ester groups, which contains an additive that affects the degree of abhesiveness, the additive being obtained by the reaction of an MQ resin with a polysiloxane containing (meth)acrylate ester groups.

12 Claims, No Drawings

ABHESIVE COATING COMPOSITION WITH AN ADDITIVE, WHICH AFFECTS THE DEGREE OF ABHESIVENESS

This is a continuation-in-part of application Ser. No. 08/214,862, filed Mar. 17, 1994, now abandoned.

FIELD OF INVENTION

The invention relates to an abhesive coating composition, which contains one or more radiation-curing organopolysiloxane(s) with (meth)acrylate ester groups, an additive affecting the degree of abhesiveness and optionally a photoinitiator and conventional fillers.

BACKGROUND INFORMATION AND PRIOR ART

According to the state of the art, an additive, affecting the degree of abhesiveness, is referred to as a controlled release agent or a controlled release additive. The corresponding abbreviation is CRA. For convenience, the abbreviation CRA is used in the specification.

Abhesive coating compositions are used on a large scale for coating particularly 2-dimensional materials, in order to decrease the tendency of products to adhere to these surfaces. Abhesive coating compositions are used, for example, to coat paper, films or sheets, which are to act as backing for pressure-sensitive labels. The labels, provided with a pressure-sensitive adhesive, adhere to the coated surface to a still sufficient extent to enable the backing sheets with the pressure sensitive labels to be handled. The adhesion of the pressure-sensitive labels to the backing sheets must be high enough, so that, when the labels are applied by machine on, for example, packing drums, there is no premature detachment as the backing sheet with the labels is passed over guide rollers. On the other hand, however, it must be possible to pull the labels from the coated backing sheet without significantly affecting their adhesive power for later use. Further possible applications for abhesive coating compositions are packing papers, which are to be used, particularly, for packing sticky goods. Such abhesive papers, sheets or films are used, for example, to pack foods or industrial products such as bitumen.

A further use for abhesive coating compositions exists in the manufacture of tapes, for example, for so-called disposable diapers. If the abhesiveness is too high, that is, the release value too low, the diaper does not remain closed reliably. If the abhesiveness is too low and, with that, the release value too high, the fastening cannot be undone without tearing the diaper.

An important requirement of abhesive coating compositions therefore is the possibility of being able to adjust the degree of abhesiveness and, with that, reciprocally, the force required for the separation in accordance with the intended application.

The literature, in which the composition, manufacture and use of abhesive coatings are described, is very extensive. The following patents and Offenlegungsschriften are named as being representative of the state of the art.

The German patent 29 48 708 discloses a method for the preparation of organopolysiloxanes, modified with pentaerythritol triacrylate or pentaerythritol trimethacrylate esters and synthesized from organochloropolysiloxanes, optionally with the addition of HCl-binding utilizing agents, with the distinguishing feature that organopolysiloxanes having the formula

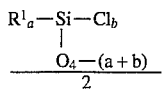

($R^1$=alkyl with 1 to 4 carbon atoms, vinyl and/or phenyl, with the proviso that at least 90 mole percent of the $R^1$ groups are methyl; a has a value of 1.8 to 2.2 and b a value of 0.004 to 0.5) are reacted first with, based on the SiCl groups, at least 2-molar amounts of a dialkylamine, the alkyl groups of which in each case have 3 to 5 carbon atoms, the carbon atoms adjacent to the nitrogen carrying not more than 1 hydrogen atom, and the reaction product is reacted with at least equimolar amounts of pentaerythritol triacrylate or pentaerythritol trimethacrylate and the reaction product is then separated by known methods from solid components suspended in the product.

The abhesive properties of the acrylate ester-modified organopolysiloxanes are improved by removing the suspended solid components from the reaction product. In the aforementioned patent 29 48 708, organopolysiloxanes with SiH groups are named as modifiers, particularly for lowering the viscosity of the coating compositions. Free radical starters, such as benzophenone, its oxime or benzoin ether are added in an amount of 2 to 5% by weight, based on the modified siloxane, to the coating compositions, which are then cured under a suitable source of UV radiation.

It is an object of the European publication 0 168 713 to increase the adhesion of the resins to the substrate and, at the same time, to improve the abhesive surface properties. According to this European patent, this combination of properties is found in organopolysiloxane mixtures modified with (meth)acrylate esters, which are characterized in that they consist essentially of an equilibrated organopolysiloxane with, on the average, more than 25 and fewer than 200 silicon atoms and, in addition, contain 2 to 30% by weight of organopolysiloxane with, on the average, 2 to 25 silicon atoms and 2 to 30% by weight of organopolysiloxane with, on the average, 200 to 2,000 silicon atoms. These teachings are based on the knowledge that, if the content of low molecular weight components is too small, there is inadequate adhesion to the substrate. If, however, higher molecular weight components are lacking in the mixture, the abhesiveness of the mixture is inadequate. If the content of low molecular weight and high molecular weight components is too large, the mixture does not cure under the given conditions. It is therefore important to adhere exactly to the conditions for selecting the three components of the organopolysiloxane mixture.

Adhering to the requirements of the aforementioned three-component system proved to be difficult. An attempt was therefore made to achieve the same result with a mixture consisting of two siloxane components, which can be synthesized with better reproducibility. This led to the German patent 38 41 843, which relates to a mixture of organopolysiloxanes, which are modified with (meth)acrylate esters and characterized in that they contain 60 to 95% by weight of a modified organopolysiloxane A with, on the average, 5 to 50 silicon atoms, and 5 to 40% by weight of a modified organopolysiloxane B with, on the average, at least 50 silicon atoms, with the proviso that the number of silicon atoms in the average molecule of the modified organopolysiloxane B is at least twice the number of silicon atoms in the average molecule of the modified organopolysiloxane A.

In the course of the development of further radiation-curable coating compositions based on organopolysiloxanes with (meth)acrylate ester groups, further requirements, which the properties of such compounds must meet, were observed. From the European publication 0 281 681, it can be inferred that the following combination of properties is aimed for:

1. Satisfactory adhesion to the backing that is to be coated;
2. High-curing rate on the backing;
3. Chemical and physical resistance of the cured coating;
4. High flexibility of the cured coating;
5. Abhesive properties with respect to adhesive products, adaptability of the abhesive coating to the chemical character of the adhesive; and
6. Adjustability of the desired degree of abhesiveness.

The object of this European patent 0 281 681 are polysiloxanes, which have (meth)acrylate ester groups linked over SiC groups and are obtained by the reaction of epoxy-functional polysiloxanes of the general formula

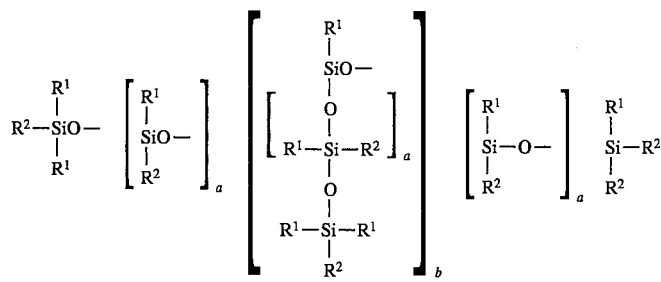

wherein $R^1$ are the same or different and represent low molecular weight alkyl groups with 1 to 4 carbon atoms or phenyl groups, $R^2$ is the same as $R^1$ or represents the $R^3$ group, the $R^3$ group consisting of
70 to 100% of epoxy-functional groups, and
30 to 0% of alkyl groups with 2 to 10 carbons atoms or hydrogen groups, with the proviso that at least 1.5 epoxy groups are contained in the average molecule, a has a value of 1 to 1000, and b has a value of 0 to 10, with such amounts of a mixture of acids, consisting of 10 to 90 mole percent of (meth)acrylic anhydride and 90 to 10 mole percent of (meth)acrylic acid, the sum having to add up to 100 mole percent, that there are 0.8n to 1.9n and preferably 1.1n to 1.9n acid equivalents for n epoxide equivalents, at elevated temperatures, optionally in the presence of solvents and conventional esterification catalysts.

In the reaction of epoxy-functional, modified siloxanes with an acid mixture of (meth)acrylic anhydride and (meth)acrylic acid, (meth)acrylate esters are formed according to the following equations:

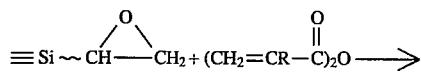

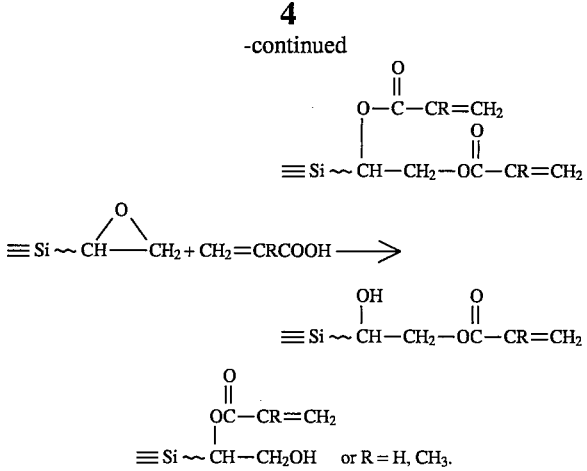

Depending on the composition of the mixture consisting of (meth)acrylic anhydride and (meth)acrylic acid and the amount of mixture used (based on the epoxide group), the organopolysiloxanes, modified pursuant to the invention, have predetermined amounts of (meth)acrylate diester groups, (meth)acrylate monoester groups, hydroxyl groups and, optionally, unreacted epoxide groups. Since it has been observed that the abhesiveness increases with the number of (meth)acrylate ester groups while the compatibility with the substrate improves with the content of hydroxyl groups and, optionally, epoxide groups, these mutually opposite properties can easily be brought into a balanced relationship desired for the application.

Furthermore, the cross-linking density of the cured siloxanes can be influenced by the ratio of monoester groups to diester groups. Differences in cross-linking density result in different physical properties; for example, if the cross-linking density is increased, the hardness and the mechanical resistance are increased and, if the cross-linking density is decreased, the glass transition temperature and elasticization are lowered.

A further possibility for influencing the abhesive properties is given by the fact that up to 30% of the $R^3$ groups can optionally be substituted alkyl groups with 2 to 20 carbon atoms. Due to the presence of alkyl groups with 2 to 20 carbon atoms, the organic character of the modified polysiloxanes is increased. In this connection, it can generally be assumed that the abhesive properties of the polysiloxane are selectively reduced by increasing the content of alkyl groups as well as by increasing the chain length of the alkyl groups.

A further possibility for influencing the abhesive properties of such coating compositions can be taken from the German 38 10 140. The object of this patent is the use of polysiloxanes with (meth)acrylate ester group linked over SiC groups, obtainable by the reaction of polysiloxanes of the general, average formula

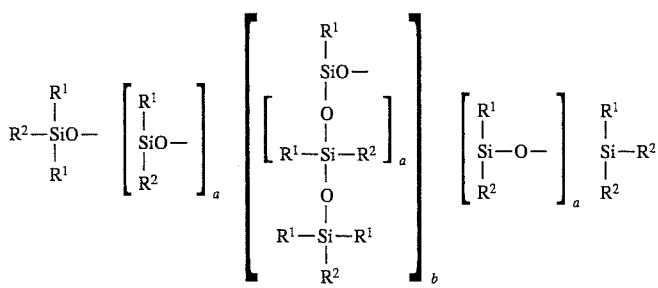

wherein
the $R^1$ groups are the same or different and in each case represent low molecular weight alkyl groups with 1 to 4 carbon atoms or phenyl groups, the $R^2$ groups can partly have the meaning of the $R^1$ groups, the remaining $R^2$ groups consisting to the extent of 70 to 100% of hydroxy-functional groups of the formula $-CH_2(CR^3{}_2)_\xi-(OCH_2CHR^4)_v-OH$, $-CH=CH-CR^3{}_2-OH$ and/or groups of the formula

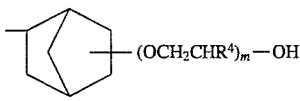

wherein
$R^3$ are the same or different and in each case represent a hydrogen or alkyl group with 1 to 4 carbon atoms,
$R^4$ are the same or different and in each case represent a hydrogen or alkyl group with 1 to 10 carbon atoms, and the subscripts
n=0 to 10 and
m=0 to 40 and
30 to 0% of optionally substituted alkyl groups with 2 to 20 carbon atoms and/or hydrogen groups,
with the proviso that at least 1.8 hydroxy-functional $R^2$ groups are contained in the average molecule,
a has a value of 1 to 1000, and
b has a value of 0 to 10,
with, based on the hydroxyl groups, 0.4 to 0.9 molar amounts of (meth)acrylic acid and up to 0.6 molar amounts of a monocarboxylic acid, which is free of double bonds capable of polymerizing, wherein the sum of the molar amounts of acids must not exceed 1.0, under conventional esterification conditions, as radiation curable coating components.

For the organopolysiloxanes, which are to be used pursuant to this patent, 40 to 90 mole percent of the hydroxy-functional $R^2$ groups are present in the form of their (meth)acrylate esters. Up to 60 mole percent of the hydroxy-functional $R^2$ groups can be present in the form of monocarboxylate esters free of double bonds capable of polymerizing. Moreover, depending on the proportion of monocarboxylic acid used for the esterification, the hydroxy-functional $R^2$ groups can moreover be present unchanged. The ratio of the (meth)acrylate ester groups and monocarboxylic ester groups, derived from the $R^2$ groups to the unchanged hydroxy-functional $R^2$ groups arises out of the nature and amount of the (meth)acrylic acid/monocarboxylic acid mixture used for the esterification.

By these means, a person well versed in the state of the art is able to adjust, in the desired manner, the properties of the organopolysiloxanes, which are to be used pursuant to the patent:

1. The abhesiveness of the organopolysiloxanes, which are to be used pursuant to the invention, increases after their curing with the number of (meth)acrylate ester groups in the polymer molecule. As the cross-linking density increases, the glass transition temperature of the cured coating increases and the flexibility of the coating decreases. At the same time, the chemical and physical stability of the cured coating increases.

2. As the proportion of monocarboxylate ester groups, which are free of double bonds capable of polymerizing, increases, the abhesiveness decreases and the adhesion to the backing improves. This decrease in abhesiveness is additionally reinforced by hydroxyl groups of unreacted, hydroxy-functional $R^2$ groups, which may still be present. By these means, the abhesive coating can also be adapted to the chemical character of the adhesive.

In the German patent 38 20 294, as in the German patent 38 10 140, polysiloxanes with (meth)acrylate ester groups linked over SiC groups are described, which can be obtained by the reaction of polysiloxanes of the general, average formula

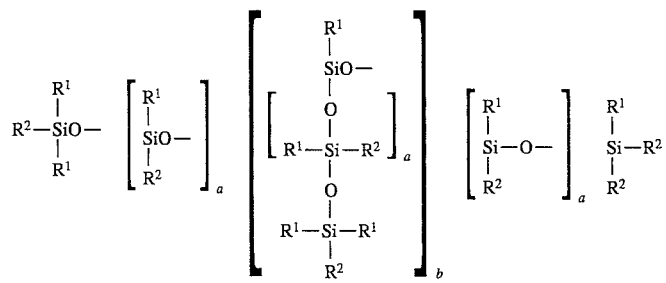

wherein
R¹ are the same or different and in each case represent lower molecular weight alkyl groups with 1 to 4 carbon atoms or phenyl groups, R² partially can be the same as the R¹ groups, the remaining R² groups being
up to 70 to 100% conventional epoxy-functional groups and
up to 30 to 0% alkyl groups with 2 to 10 carbon atoms or hydrogen groups,
with the proviso that at least 1.8 epoxy groups are contained in the average molecule a has a value of 1 to 1000 and b has a value of 0 to 10, with, based on the epoxide groups, 0.4 to 0.9 molar amounts of (meth)acrylic acid and the reaction of the remaining epoxide groups with a monocarboxylic acid with 2 to 12 carbon atoms, which is free of double bonds capable of polymerizing.

For the state of the art named so far, it is necessary to synthesize a new siloxane resin, modified so as to be adapted approximately to the intended use, for each special, intended use. This leads to a large number of products, the manufacture of which, relative to the amount used, is comparatively expensive.

It is therefore more desirable to produce a basic resin or a corresponding mixture of basic resins of high abhesiveness (which is the reciprocal of a low release force) and to adjust the basic resin or the mixture of basic resins with the help of an additive, namely a controlled-release agent (=CRA) selectively to the desired lesser abhesiveness, so that the abhesiveness decreases in proportion to the concentration of CRA. The basic resin of very high abhesiveness can thus theoretically be adjusted to any abhesiveness with the CRA.

Such CRA products are already known and described, for example, in the European patent applications 0 464 706 and 0 473 995.

The object of the European publication 0 464 706 is a UV-curable silicone preparation consisting of (A) 100 parts by weight of an epoxy-functional polyorganosiloxane, which comprises units of the formula R¹R²SiO, wherein R¹ is a hydrogen group or a univalent hydrocarbon group and R² is a hydrogen group, a univalent hydrocarbon group or a univalent epoxy-functional organic group, with the proviso that at least two of all the organic groups are such univalent, epoxy-functional organic groups, (B) 1 to 80 parts by weight of a copolymer, which regulates the peel force, is soluble in component (A) and is selected from a group, which consists of
  (i) a copolymer corresponding to a structure unit MQ or $M^AQ$,
  (ii) a copolymer corresponding to a structure unit $M^AT$, $MT^A$ or $M^AT^A$, and
  (iii) a copolymer corresponding to a structure unit $M^ADQ$, $MD^AQ$ or $M^AD^AQ$,
  wherein
  M is an $R^3{}_3SiO_{1/2}$ unit,
  $M^A$ is an $R^3{}_2R^4SiO_{1/2}$ unit,
  D is an $R^3{}_2SiO$ unit,
  $D^A$ is an $R^3R^4SiO$ unit,
  T is an $R^3SiO_{3/2}$ unit,
  $T^A$ is an $R^4SiO_{3/2}$ unit,
  Q is an $SiO_2$ unit,
  wherein
  $R^3$ is a univalent hydrocarbon group free of olefinic unsaturation, and $R^4$ is an alkenyl group, and (C) a catalytically effective amount of an onium salt as photoinitiator.

The copolymer (B) is usually also referred to as a so-called MQ or MQT resin. In addition, this resin fulfills the role of a CRA.

However, if such MQ resins are used in an analogous manner as CRA for radiation-curable, abhesive coating compositions based on (meth)acrylate-modified polysiloxanes, satisfactory results are not obtained, since the abhesiveness of the radiation-cured preparation changes upon storage (ages); in particular, the abhesiveness decreases and the release force increases. This effect is all the more pronounced if the radiation-cured preparation is stored as a laminate, that is, in a composite with the pressure-sensitive adhesive. In particular, after storage for a longer time or at an elevated temperature, this can lead to an interlocking of the material, so that the release coating and the pressure-sensitive adhesive can no longer be separated from one another without damaging the product. Such an abhesive release coating therefore does not have an adequate shelf life.

The European patent application 0 473 995 relates to a UV-curable epoxy-functional silicone preparation with controlled-release behavior, which contains the following components:

(A) an epoxy-functional diorganopolysiloxane of the general formula

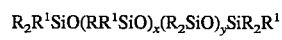

wherein
R in each case is a lower molecular weight alkyl group with 1 to 8 carbon atoms,
R¹ in each case is a univalent, cycloaliphatic, epoxy-functional organic group with 2 to about 20 carbon atoms,
x is a number from about 1 to about 50, and
y is a number from about 1 to about 1000, (B) a catalytic amount of a photocatalyst or a combination of photocatalysts, and (C) about 1 to about 30% by weight, based on (A), of a siloxane resin which contains univalent $R^2{}_3SiO_{1/2}$- and $R^3R^2{}_2SiO_{1/2}$-units and quadrivalent $SiO_{4/2}$ units, the ratio of the univalent to the quadrivalent units being 0.6:1 to 1.1:1, and wherein $R^2$ in each case is a univalent hydrocarbon group with not more than 2 carbon atoms, $R^3$ is a univalent epoxy-functional organic group with about 2 to 20 carbon atoms and wherein the $R^3R^2{}_2SiO_{1/2}$ units are present in an amount of 1 to 90%, based on the total number of univalent units present.

Here also, the CRA is a so-called MQ resin. The addition of such epoxy-functional MQ resins to (meth)acrylate-modified polysiloxanes also leads to coating compositions, which have the disadvantages of an inadequate shelf life, which have already been mentioned above. Moreover, such epoxy-functional MQ resins are synthesized by means of a multi-step method involving the hydrosilylation of previously synthesized SiH-functional MQ resins with vinyl cyclohexene oxide. Admittedly, these reactions can be carried out; however, they are not very practicable from a reaction technology point of view. Because of the high molecular weight structure of the MQ resins that are to be modified and the fact that, for reasons of compatibility, solvents are employed, the reaction proceeds very slowly for kinetic reasons and leads to incomplete conversions when the usual excess of educts and concentrations of catalysts are used.

The present invention is therefore concerned with the technical problem of finding controlled-release agents (CRA), which do not have these disadvantageous properties of the change in the abhesiveness upon storage or, at the very least, have these properties to a significantly lesser extent.

The invention is furthermore concerned with the technical problem of synthesizing these controlled-release agents as reproducibly as possible, with the simplest possible method, in high yield and using easily obtainable starting materials. Such CRAs should meet the following technically important requirements:

a) The abhesiveness should be adjusted so that it is almost independent of the rate at which the adhesive is pulled from the release coating.

b) A uniform release behavior should be attained with no or only a slight development of noise; this means that oscillating release fluctuations, which result in a crackling noise (so-called "zip" or also "slip stick"), are avoided during the peeling process.

Surprisingly, it has now been found that the disadvantages listed above can be avoided by the addition of special CRAs to (meth)acrylate-modified polysiloxanes, such CRAs, synthesized pursuant to the invention, also fulfilling the economic and technical requirements.

OBJECT OF THE INVENTION

An object of the present invention is an abhesive coating composition, which contains one or more radiation-curing organopolysiloxane(s) with (meth)acrylate ester groups, an additive affecting the degree of abhesiveness and, optionally, a photoinitiator and conventional fillers, which is characterized in that the additive is a polysiloxane, which is obtained by the reaction of a siloxane resin A of the general formula $$\left[\begin{array}{c} R^1 \\ | \\ R^2-Si-O_{1/2}- \\ | \\ R^1 \end{array}\right]_x \quad \left[\begin{array}{c} | \\ O_{1/2} \\ | \\ -_{1/2}O-Si-O_{1/2}- \\ | \\ O_{1/2} \\ | \end{array}\right]_y \quad \left[\begin{array}{c} | \\ O_{1/2} \\ | \\ -_{1/2}O-Si-R^3 \\ | \\ O_{1/2} \\ | \end{array}\right]_z$$

wherein $R^1$ is an alkyl group with 1 to 4 carbon atoms, $R^2$ is an alkyl group with 1 to 4 carbon atoms or an alkenyl group with 2 to 6 carbon atoms, $R^3$ is the $R^1$ group or an alkoxy group with 1 to 4 carbon atoms or a hydroxy group, the number average molecular weight of the siloxane A resin being 500 to 100,000 and x, y and z being numbers, wherein the quotient x/(y+z) being equal to 0.5/1.0 to 1.5/1.0 and the quotient z/x being equal to 0/1.0 to 0.4/1.0, with an organopolysiloxane B of the general formula

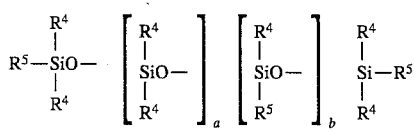

wherein $R^4$ is an alkyl group with 1 to 4 carbon atoms, a phenyl group a hydrogen group or an

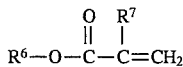

group and $R^5$ is identical with $R^4$ or is the

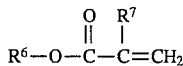

group, in which $R^6$ is a divalent optionally unsaturated hydrocarbon group with up to 20 carbon atoms, which can be interrupted by an oxygen atom, and $R^7$ is a methyl or hydrogen group, with the proviso that at least one $R^4$ group is an

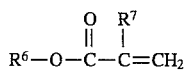

group, a has a value of 0 to 100, and b has a value of 0 to 50, in the ratio by weight of siloxane resin A to polysiloxane B of 100:0.1 to 50 in the presence of an acidic equilibration catalyst at a temperature ranging from 0° to 140° C., optionally in the presence of an inert organic solvent.

SUMMARY OF THE INVENTION

In the inventive, abhesive coating composition, the siloxane resin A represents the CRA product. Moreover, CRAs, produced in this way, have the advantage that it is possible to adjust the content of reactive (meth)acrylate groups selectively and to vary this content within wide ranges. The incorporation into the polymeric network structure and the curing properties can therewith be selectively adapted to the given system.

$R^1$ is an alkyl group with 1 to 4 carbon atoms and preferably a methyl group.

$R^2$ also is an alkyl group with 1 to 4 carbon atoms and preferably the methyl group or an alkenyl group with 2 to 6 carbon atoms, particularly the vinyl or hexenyl group.

$R^3$ has the meaning of the $R^1$ group or is an alkoxy group with 1 to 4 carbon atoms or a hydroxy group. If $R^3$ is a hydroxy or alkoxy group, it is preferred that only a portion of the $R^3$ groups have this meaning, that is, the content of SiOH or Si-alkoxy groups, based on the siloxane resin, shall preferably be less than 4% by weight and particularly less than 2% by weight. An excessively high content of SiOH or Si-alkoxy groups can interfere with the equilibration reaction.

If commercially obtainable MQ resins are used, the SiOH content of which is undesirably high, these SiOH groups can be converted by reaction with trialkylhalogensilanes or hexamethyldisilazane into SiOSi(CH$_3$)$_3$ groups.

The number average molecular weight of the siloxane resin A shall be 500 to 100,000, x, y and z being numbers, the value of which arises, in conjunction with the molecular weight out of the fact that the quotient x/(y+z) is equal to 0.5/1.0 to 1.5/1.0 and
the quotient z/x is equal to 0/1.0 to 0.4/1.0.
Examples of suitable MQ resins are

[(CH$_3$)$_3$SiO$_{1/2}$]$_{12}$[SiO$_2$]$_{20}$[O$_{3/2}$SiOH]$_2$
[(CH$_3$)$_3$SiO$_{1/2}$]$_{25}$[SiO$_2$]$_{25}$[O$_{3/2}$Si—O—CH$_3$]$_1$
[(H$_2$C=CH) (CH$_3$)$_2$SiO$_{1/2}$]$_{38}$[SiO$_2$]$_{33}$
[(CH$_3$)$_3$SiO$_{1/2}$]$_5$[SiO$_2$]$_4$]O$_{3/2}$Si—CH$_3$].

The organopolysiloxane B is a conventional (meth)acrylate ester-modified organopolysiloxane of the general formula

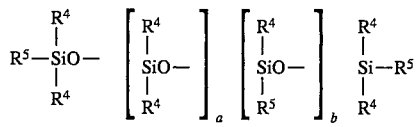

wherein
R$^4$ is an alkyl group with 1 to 4 carbons atoms, a phenyl group or a hydrogen group, and
R$^5$ has the meaning of the R$^4$ group or represents the

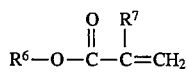

group, in which
R$^6$ is a divalent, optionally unsaturated hydrocarbon group with up to 20 carbon atoms, which can be interrupted by an oxygen atom, and
R$^7$ is a methyl or hydrogen group,
with the proviso that at least one R$^4$ group is an

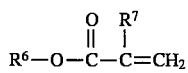

group,
a has a value of 0 to 100, and
b has a value of 0 to 50.

The R$^6$ group preferably is selected from the following divalent groups:

(1) Linear or branched aliphatic hydrocarbon groups with 1 to 12 carbon atoms,
(2) Linear or branched olefinically unsaturated hydrocarbon group with 2 to 20 carbon atoms,
(3) Cyclic, aliphatic hydrocarbon group with 6 to 20 carbon atoms,
(4) Aryl or alkaryl groups with 6 to 20 carbons atoms.

Examples of R$^6$ groups with the meaning (1) are

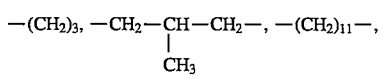

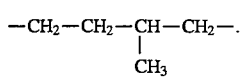

Examples of R$^6$ groups with the meaning (2) are

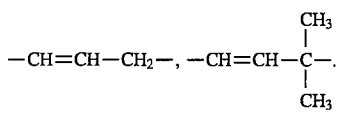

Examples of R$^6$ groups with the meaning (3) are

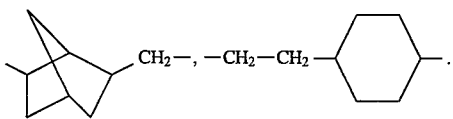

Examples of R$^6$ groups with the meaning (4) are

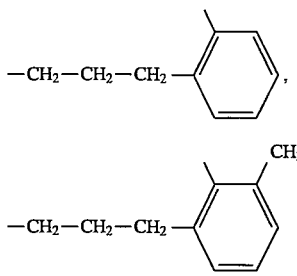

Examples of organopolysiloxanes of formula (B) are

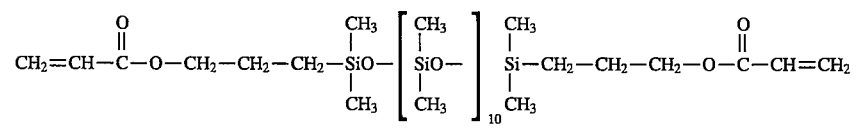

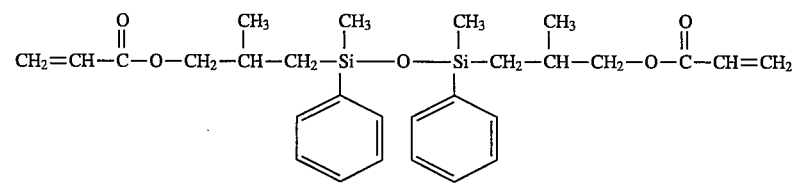

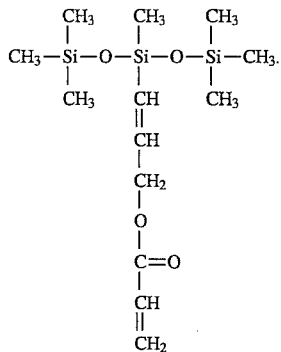

The siloxane resin A is mixed with the polysiloxane B in a weight ratio of 100:0.1 to 50 and in the presence of an acidic equilibrating catalyst at a temperature from 0° to 140° C. The equilibration is carried out optionally and preferably in the presence of an inert solvent, such as toluene or xylene. As acidic equilibrating catalyst, especially concentrated sulfuric acid or trifluoromethanesulfonic acid is used in amounts of 0.5 to 10% by weight based on the reaction formulation. Further suitable equilibrating catalysts are ion exchange resins with sulfonic acid groups, acid-activated fuller's earths, zeolites and phosphornitrilochloride.

The catalyst is added in an amount of 0.05 to 10% by weight based on the total weight of the reactants, as a result of which the equilibration reaction is started. At catalyst concentrations lower than 0.05% by weight, the reaction rate of the equilibration is too slow. At higher catalyst concentrations above 10%, thermal degradation of the (meth)acrylate groups cannot be excluded. Preferably, the equilibration is carried out at temperature from 50° to 120° C. with 0.1 to 1% by weight of catalyst. The equilibration is completed after 2 to 24 hours.

At the end of the equilibration reaction, the equilibrating catalyst used is neutralized by the addition of small amounts of a suitable basic substance or, in the case of heterogeneous equilibration catalysts, removed from the product by filtration.

The additive (CRA), obtained pursuant to the invention, is a highly viscous to solid substance, depending on the molecular weight and the M/Q ratio adjusted. It is soluble in the (meth)acrylate ester group-modified organopolysiloxane. In order to facilitate the production of the finished preparations, it is advisable to dissolve the additive, contained pursuant to the invention, in a solvent and to add the solution, obtained after the equilibration reaction and after the neutralization of the equilibrating catalyst, optionally after adjusting the concentration to a desired value by distilling off a portion of the solvent, in the form of a concentrated solution to the basic resin.

Possible uses for the inventive abhesive coating compositions are, for example, the coating of 2-dimensional substrates, which are used as backing for pressure-sensitive labels or for producing adhesive tape. A further possible use is the coating of packing papers, which are used to pack sticky goods. Moreover, the inventive, abhesive coating compositions can also be used for the surface-coating of plastics, such as polycarbonate, and as embedding compositions for electronic components.

If it is intended to cure the abhesive compositions by UV light, a photoinitiator, which is active within the wavelength of the UV light, must be added to the coating composition. As already stated, oximes, such as benzophenone or benzoin ether are used for this purpose according to the state of the art. The addition of special photoinitiators is unnecessary if the curing is carried out with electron beams or gamma radiation.

Examples of suitable fillers, the use of which is, however, not absolutely necessary, are highly dispersed silica or organic polymers from fluorohydrocarbons.

In the following examples, the synthesis of the additive, obtained pursuant to the invention, is shown, it being understood that the examples are provided by way of illustration and not by way of limitation. In addition, inventive abhesive coating compositions are prepared using the CRA, which is contained pursuant to the invention, and the release behavior of these coating compositions is determined.

EXAMPLE 1

A 50% toluene solution (165 g) of a commercial MQ resin with an number average molecular weight of 2442 g/mole, an M/Q ratio of 0.67 and an SiOH content of 1.5% is mixed in a 500 mL 3-neck flask, equipped with stirrer, thermometer and reflux condenser, with stirring with 14.9 g (0.018 moles) of a polydimethylsiloxane polyfunctionalized with terminal acryloxypropyl groups, which is synthesized as described in the German patent 38 10 140, Example 1, and has the following average formula

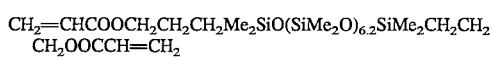

After that, the air is removed from the reaction flask by passing in nitrogen. Under the blanket of nitrogen and while stirring, 0.54 g (0.3% by weight) of trifluoromethanesulfonic acid are added. Subsequently, the temperature is raised within 30 minutes to 90° C. and stirring is continued at this temperature for a further 4 hours. At the end of the reaction, the reaction solution is cooled to 50° C., mixed with 2% by weight of sodium carbonate in order to neutralize the trifluoromethanesulfonic acid and kept at this temperature for 1 hour with stirring. After cooling to room temperature and filtering through a celite filter disk, the filtrate is freed from toluene and volatile by-products by vacuum distillation at a temperature of 80° C. and a pressure of about 2 torr.

The reaction product (106.9 g, 93.8% of the theoretical yield), which is referred to below as CRA-1, is a white, amorphous solid, which is soluble in toluene, forming a clear solution.

Aside from the typical bands of the M and Q units of the starting material, dimethylsiloxy and (acryloxypropyl)-dimethylsiloxy can be detected by means $^{29}$Si spectroscopy.

EXAMPLE 2

A mixture of 95.2 g of a 60% toluene solution of a commercial MQ resin with an number average molecular weight of 1133 g/mole, an M/Q ratio of 0.75 and an SiOH content of 1.4%, and 27.1 g (0.075 moles) of 1,3-bis-(3-acryloxypropyl)-tetramethyldisiloxane (synthesized by the esterification of 1,3-bis( 3-hydroxypropyl)-tetramethyldisiloxane (ABCR) with acrylyl chloride in benzene/pyridine), as well as 0.25 g (0.3% by weight) of trifluoromethanesulfonic acid is heated to 95° C. and stirred at this temperature for 6 hours. After this, the reaction solution is cooled to 50° C., neutralized with 2% by weight of sodium carbonate as described in Example 1 and then filtered. The filtrate is concentrated in a rotary evaporator and then vacuum distilled (80° C., 2 torr). The reaction product, referred to in the following as CRA-2, is a homogeneous, yellow mass with a viscosity of 24,300 mPas (20° C.) and dissolves in toluene to form a clear solution.

Analyses by means of gel permeation chromatography (GPC) and $^{13}C$ and $^{1}H$ NMR spectroscopy confirm the uniformity of the reaction product and show that the reaction product has bands typical of acryloxypropyl-functional siloxanes. Furthermore, distinct amounts of hexamethyldisiloxane can be detected in the distillate by means of GC-MS.

EXAMPLE 3

A partially lateral acryloxypropyl-functional polydimethylsiloxane (27.3 g, 0.01 moles) of average formula $$Me_3SiO(SiMe_2O)_{16.2}(CH_2=CHCOOCH_2CH_2CH_2SiMeO)_{7.8}SiMe_3$$

synthesized as described in the German patent 38 10 140, Example 2, is stirred for 6 hours under a blanket of nitrogen at 100° C. with 245 g of a 50% xylene solution of a commercial MQ resin (average molecular weight: 2067 g/mole, M/Q ratio: 0.71 and SiOH content: 0.25%) and 0.78 g (0.3% by weight) of trifluoromethanesulfonic acid. While the reaction mixture is cooling down, 2% by weight of sodium carbonate are added and the mixture is stirred until a test for traces of acid is negative. After the filtration, the volatile components are removed by distillation at 80° C. and 2 torr. A homogeneous, resinous product (146 g) is obtained which, when analyzed by $^{1}H$, $^{13}C$ and $^{29}Si$ NMR spectroscopy has dimethylsiloxy and (acryloxypropyl)methylsiloxy units as well as M and Q units.

Comparison Example

As Comparison Example, Experiment 2 is repeated, however without the addition of trifluoromethanesulfonic acid as equilibrating catalyst. At the end of the reaction, the reaction mixture is worked up in the manner described. A cloudy, non-homogeneous reaction mass of slurried MQ resin in 1,3-bis(3-acryloxypropyl)-tetramethyldisiloxane is obtained. NMR spectroscopic data and GPC analysis also clearly show that a physical mixture of the two mutually incompatible starting components is present.

Testing the Application

Tables 1 and 2 show various formulations with CRA products prepared pursuant to the invention and with comparison mixtures, which are not of the invention. The results, which are obtained when these formulations are used to prepare coatings, which repel adhesive materials, are listed in Tables 3 to 6.

As basic resins I, II and III, the formulations contain different acyloxypropyl-functional polydimethylsiloxanes, which can be described by means of the average formulas given below.

Basic Resin I:

$$Me_3SiO(SiMe_2O)_{190.6}(CH_2=CHCOOCH_2CH_2CH_2SiMeO)_{7.2}SiMe_3$$

Basic Resin II:

$$Me_3SiO(SiMe_2O)_{24.3}(CH_2=CHCOOCH_2CH_2CH_2SiMeO)_{6.6}SiMe_3$$

Basic Resin III:

$$CH_2=CHCOOCH_2CH_2CH_2Me_2SiO(SiMe_2O)_{30.2}SiMe_2CH_2CH_2\\CH_2OOCCH=CH_2$$

Tripropylene glycol diacrylate (TPGDA), which simultaneously acts as a reactive diluent, is used as basic resin component IV.

The inventive formulations (Table 1) are prepared by the method of dissolving the CRA reaction products in an appropriate basic resin component. For this purpose, 50% by weight CRA solutions are prepared by dissolving appropriate amounts of the CRA product used at room temperature with stirring in toluene. This toluene solution is mixed with an appropriate basic resin (in the examples presented, mostly basic resin I) and 100 ppm of methylhydroquinone are admixed as stabilizer in such a manner that, after the toluene is removed by distillation in the rotary evaporator at 75° C. and 10 torr, the remaining clear, single phase, light brown polymer mixture has a ratio of acrylate-functional MQ resin (CRA) to basic resin of about 40:60.

Before the addition of further components to the formulation, this basic mixture is optionally diluted by the further addition of basic resin in order to obtain mixtures with varying contents of CRA.

The formulations of comparison examples (Table 2) are prepared similarly by dissolving the solutions of the MQ resins in xylene in the corresponding basic resins.

TABLE 1

| | Inventive Products | | | | | | | | |
|---|---|---|---|---|---|---|---|---|---|
| | A | B | C | D | E | F | G | H | I |
| Basic resin I | 43 | 53 | 63 | 68 | 50 | — | — | 40 | 48 |
| Basic resin II | 25 | 25 | 25 | 25 | 30 | 20 | 25 | 27 | 29 |
| Basic resin III | — | — | — | — | — | 55 | 40 | — | — |
| Basic resin IV | — | — | — | — | — | — | 10 | — | — |
| Inventive CRA-1 (Example 1) | 30 | 20 | 10 | 5 | — | — | — | — | 20 |
| Inventive CRA-2 (Example 2) | — | — | — | — | 20 | — | 25 | — | — |
| Inventive CRA-3 (Example 3) | — | — | — | — | — | 15 | — | 30 | — |
| Photoinitiator | 2 | 2 | 2 | 2 | — | — | — | 3 | 3 |

TABLE 2

| | Comparison Products, Not of the Invention | | | | |
|---|---|---|---|---|---|
| | J | K | L | M | N |
| Basic resin I | 73 | 53 | 50 | — | — |
| Basic resin II | 25 | 25 | 30 | 20 | 98 |
| Basic resin III | — | — | — | 55 | — |
| Basic resin IV | — | — | — | — | — |
| MQ-Resin (Example 1) | — | 20 | — | — | — |
| MQ-Resin | — | — | 20 | — | — |

TABLE 2-continued

| | Comparison Products, Not of the Invention | | | | |
|---|---|---|---|---|---|
| | J | K | L | M | N |
| (Example 2) MQ-Resin | — | — | — | 15 | — |
| (Example 3) Photoinitiator | 2 | 2 | — | — | 2 |

To check the application properties of the modified polysiloxanes, which are to be used pursuant to the invention, the products of Examples A to I, as well as the Comparison Examples J to N, which are not of the invention, are applied on 2-dimensional backing (oriented polypropylene film) and cured by the action of 2 Mrad of electron beams or, after the addition of a conventional photoinitiator (Darocure® 1173, Ciba Geigy) by the action of UV light at 120 W/cm with sheet speeds of 20 m/min. The amount applied in each case is about 0.8 g/m².

Different 25 mm wide scotch tapes were used to determine the release values, namely an acrylate adhesive-coated scotch tape, which can be obtained commercially under the name of TESA® 7475, as well as a scotch tape coated with a rubber adhesive, which is obtainable commercially under the name TESA® 7476.

To measure the abhesiveness, these scotch tapes are rolled onto the substrate and subsequently, in the case of the acrylate scotch tape, kept at 70° C. and, in the case of the rubber scotch tape, kept at 40° C. under a weight of 70 g/cm². After 24 hours, the force is measured, which is required to pull the respective scotch tape at a speed of 30 cm/min at a peel angle of 180° from the substrate. This force is referred to as release force. The general test procedure corresponds essentially to the FINAT Test Method No. 10.

TABLE 3

| | Adjusting the Release Value By Varying the Concentration of CRA | | | | |
|---|---|---|---|---|---|
| Product | A | B | C | D | J |
| Release value TESA® 7475 (cN/inch) | 167 | 64 | 32 | 20 | 9 |
| Release value TESA® 7476 (cN/inch) | 464 | 271 | 112 | 79 | 28 |

To check the aging behavior, the storage time under the conditions described above is extended to 3, 7 and 14 days. Subsequently, the release values are determined.

TABLE 4

| | Aging Behavior | | | | | | | |
|---|---|---|---|---|---|---|---|---|
| | Release Value in cN/inch after Ageing | | | | | | | |
| | TESA® 7475 | | | | TESA® 7476 | | | |
| Product | 1d | 3d | 7d | 14d | 1d | 3d | 7d | 14d |
| B | 64 | 73 | 88 | 152 | 271 | 275 | 245 | 281 |
| K | 37 | 202 | 365 | 495 | 99 | 159 | 221 | 283 |
| E | 96 | 143 | 230 | 241 | 210 | 225 | 259 | 286 |
| L | 59 | 187 | 289 | vb* | 106 | 134 | 171 | 233 |
| F | 341 | 357 | 380 | 407 | 585 | 601 | 615 | 647 |
| M | 323 | 351 | 403 | 457 | 557 | 583 | 703 | 806 | vb* = interlocked

In order to evaluate the release behavior at different peel rates, the release forces, as defined above, are determined at a peel angle of 180° at release rates of 0.04, 0.17, 0.50, 1.70 and 3.33 m/s. In this case, the samples were stored for 24 hours at room temperature under a weight of 70 g/cm².

TABLE 5

| | Behavior at Different Peeling Speeds | | | | |
|---|---|---|---|---|---|
| | Release Value in cN/inch with TESA® 7475 at | | | | |
| Product | 0.04 | 0.17 | 0.50 | 1.70 | 3.33 m/s |
| N | 116 | 50 | 30 | 21 | 12 |
| G | 110 | 139 | 141 | 124 | 112 |
| H | 63 | 60 | 58 | 52 | 42 |
| I | 47 | 57 | 59 | 55 | 45 |

To evaluate the development of noise, the TESA® 7475 was pulled off at an angle of 90° at a rate of 30 cm/min.

TABLE 6

| | Evaluating the Pull-Off Noise |
|---|---|
| Product | Noise When Pulling Off From TESA® 7475 |
| N | loud crackling |
| J | noiseless |
| I | noiseless |
| H | slight |
| G | slight |
| A | noiseless |
| B | noiseless |

We claim:
1. An abhesive coating composition containing one or more radiation-curing organopolysiloxane with (meth)acrylate ester groups, optionally a photoinitiator, a filler and a polysiloxane, obtained by reacting a siloxane resin A of the general formula

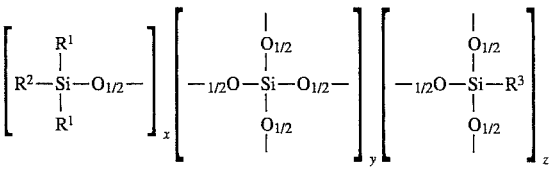

wherein

R¹ is an alkyl group with 1 to 4 carbon atoms,

R² is an alkyl group with 1 to 4 carbon atoms or an alkenyl group with 2 to 6 carbon atoms, R³ is the R¹ group or an alkoxy group with 1 to 4 carbon atoms or a hydroxy group, the number average molecular weight of the siloxane A being 500 to 100,000 and x, y and z being numbers, wherein the quotient x/(y+z) being equal to 0.5/1.0 to 1.5/1.0 and the quotient z/x being equal to 0/1.0 to 0.4/1.0, with an organopolysiloxane B of the general formula

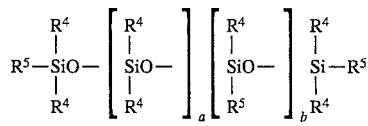

wherein

R⁴ is an alkyl group with 1 to 4 carbon atoms, a phenyl group, a hydrogen group, or an

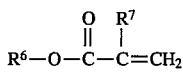

group and $R^5$ is identical with $R^4$ or is the

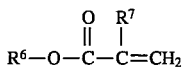

group, in which $R^6$ is a divalent, optionally unsaturated, hydrocarbon group with up to 20 carbon atoms, which can be interrupted by an oxygen atom, and $R^7$ is a methyl or hydrogen group, with the proviso that at least one $R^4$ group is an

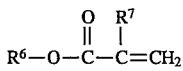

group, a has a value of 0 to 100, and b has a value of 0 to 50, in a ratio by weight of siloxane resin A to polysiloxane B of about 100:0.1 to 50 in presence of an acidic equilibration catalyst at a temperature ranging from about between 0° and 140° C.

2. The coating composition of claim 1, further comprising that the $R^1$ group is a methyl group.

3. The coating composition of claims 1 or 2, further comprising that the $R^2$ group is a methyl group.

4. The coating composition of claims 1 or 2, further comprising that the $R^3$ group is a methyl group.

5. The coating composition of claim 1 or 2, comprising that, if $R^3$ is a hydroxy group, the content of SiOH groups is not greater than 4% by weight.

6. The coating composition of claim 5, wherein the SiOH groups constitute 2% by weight.

7. The coating composition of claim 1 or 2, comprising that the $R^4$ group is a methyl group.

8. The coating composition of claim 1, wherein polysiloxane is prepared in presence of an inert organic solvent.

9. The coating composition of claims 1 or 2 comprising that the $R^6$ group is selected from the following divalent groups:

(1) Linear or branched aliphatic hydrocarbon groups with 1 to 12 carbon atoms, (2) Linear or branched olefinically unsaturated hydrocarbon group with 2 to 20 carbon atoms, (3) Cyclic, aliphatic hydrocarbon group with 6 to 20 carbon atoms, or (4) Aryl or alkaryl groups with 6 to 20 carbons atoms.

10. The coating composition of claims 1 or 2 comprising that the $R^7$ group is a hydrogen group.

11. The coating composition of claims 1 or 2 comprising that sulfuric acid or trifluoromethanesulfonic acid is used in amounts of about between 0.05 and 10% by weight, based on the reaction formulation, as acidic equilibration catalyst.

12. The coating composition of claims 1 or 2 comprising that the equilibration is carried out at about between 50° and 120° C.

* * * * *